United States Patent
Jamison et al.

(10) Patent No.: US 11,230,654 B2
(45) Date of Patent: Jan. 25, 2022

(54) CALCIUM CARBONATE COATED MATERIALS AND METHODS OF MAKING AND USING SAME

(71) Applicant: Halliburton Energy Services, Inc., Houston, TX (US)

(72) Inventors: Dale E. Jamison, Humble, TX (US); Xiangnan Ye, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/753,967

(22) PCT Filed: Jun. 4, 2019

(86) PCT No.: PCT/US2019/035354
§ 371 (c)(1),
(2) Date: Apr. 6, 2020

(87) PCT Pub. No.: WO2020/246964
PCT Pub. Date: Dec. 10, 2020

(65) Prior Publication Data
US 2021/0009881 A1    Jan. 14, 2021

(51) Int. Cl.
*C09K 3/14*         (2006.01)
*C11D 3/12*         (2006.01)
*C11D 17/04*        (2006.01)

(52) U.S. Cl.
CPC ......... *C09K 3/1436* (2013.01); *C11D 3/1233* (2013.01); *C11D 17/049* (2013.01)

(58) Field of Classification Search
CPC .... C09K 3/1436; C11D 3/1233; C11D 17/049
See application file for complete search history.

(56) References Cited

U.S. PATENT DOCUMENTS

| 6,032,471 A | 3/2000 | Johnson |
| 8,008,242 B1 | 8/2011 | Imam et al. |
(Continued)

FOREIGN PATENT DOCUMENTS

| CN | 1120922 A | 4/1996 |
| CN | 105565355 B | 8/2018 |
(Continued)

OTHER PUBLICATIONS

PubChem "Compound Summary Calcium carbonate". pp. 1-15 (Year: 2021).*
(Continued)

*Primary Examiner* — Pegah Parvini
*Assistant Examiner* — Ross J Christie
(74) *Attorney, Agent, or Firm* — Conley Rose, P.C.; Rodney B. Carroll (57) ABSTRACT

An abrasive composition comprising a substrate selected from the group consisting of a fibrous substrate, a sponge substrate, and combinations thereof and a plurality of calcium carbonate particles dispersed therein; wherein at least a portion of the plurality of calcium carbonate particles contact the substrate; wherein the fibrous substrate comprises a plurality of fibers; wherein each fiber of the plurality of fibers is characterized by an aspect ratio of equal to or greater than about 2:1; wherein the sponge substrate is characterized by a porosity of equal to or greater than about 5 vol. %, based on the total volume of the sponge substrate; and wherein the abrasive composition is characterized by an abrasiveness that is greater than the abrasiveness of the substrate in the absence of the plurality of calcium carbonate particles.

20 Claims, 3 Drawing Sheets

Calcite on Sponge

(56) References Cited

U.S. PATENT DOCUMENTS

| | | | | |
|---|---|---|---|---|
| 2006/0178090 | A1* | 8/2006 | Hibbard | A47L 13/17 |
| | | | | 451/56 |
| 2007/0065654 | A1* | 3/2007 | Hayashi | B43L 19/0025 |
| | | | | 428/306.6 |
| 2009/0075547 | A1* | 3/2009 | Rotter | D04H 1/4291 |
| | | | | 442/414 |
| 2009/0124745 | A1* | 5/2009 | Nover | C01F 11/185 |
| | | | | 524/425 |
| 2011/0251574 | A1* | 10/2011 | Hedrich | A61L 15/26 |
| | | | | 604/368 |
| 2012/0231691 | A1* | 9/2012 | Peyras-Carratte | B32B 5/022 |
| | | | | 442/372 |
| 2015/0361322 | A1* | 12/2015 | Fu | C09K 8/516 |
| | | | | 166/278 |
| 2017/0321105 | A1 | 11/2017 | McDaniel et al. | |

FOREIGN PATENT DOCUMENTS

| | | | | | |
|---|---|---|---|---|---|
| CN | 108453627 | A | * | 8/2018 | |
| JP | H04359999 | A | | 12/1992 | |
| JP | 4319922 | B2 | | 8/2009 | |
| JP | 4802474 | B2 | | 10/2011 | |
| JP | 2013136146 | A | | 7/2013 | |
| WO | 1996035011 | | | 11/1996 | |
| WO | WO-9635011 | A1 | * | 11/1996 | D04H 1/60 |
| WO | WO-2005060810 | A1 | * | 7/2005 | D04H 1/56 |
| WO | WO-2005061386 | A1 | * | 7/2005 | C01F 11/181 |

OTHER PUBLICATIONS

Foreign communication from the priority International Application No. PCT/US2019/035354, International Search Report and Written Opinion, dated Mar. 4, 2020, 12 pages.

Acknowledgement receipt and specification for International application entitled "Calcium Carbonate Coated Materials and Methods of Making and Using Same," by Dale E. Jamison, et al., filed Jun. 4, 2019 as International application No. PCT/US2019/035354.

* cited by examiner

Paper fibers before any treatment

FIG. 1A

Paper fibers after coating with $CaCO_3$

Calcite on Sponge

*FIG. 3A*

Aragonite on Sponge

*FIG. 3B*

CALCIUM CARBONATE COATED MATERIALS AND METHODS OF MAKING AND USING SAME

CROSS-REFERENCE TO RELATED APPLICATIONS

This application is a filing under 35 U.S.C. 371 of International Application No. PCT/US2019/035354 filed Jun. 4, 2019, entitled "Calcium Carbonate Coated Materials and Methods of Making and Using Same," which application is incorporated by reference herein in its entirety.

STATEMENT REGARDING FEDERALLY SPONSORED RESEARCH OR DEVELOPMENT

Not applicable.

BACKGROUND

This disclosure relates to abrasive compositions and methods of making and using same. More specifically, it relates to abrasive compositions including calcium carbonate particles, and methods of making and using same.

Abrasive materials are ubiquitous in households, as well as in industrial settings. Generally, abrasive materials are hard materials used to wear away the surface of softer, less resistant materials; and can be used for cleaning, polishing, buffing, etc., or otherwise removing an undesired material from a surface. Typically, abrasive materials contain silica and/or alumina (e.g., silica and/or alumina particles), which have a hardness of equal to or greater than about 7 on the Mohs hardness scale. However, certain surfaces that require abrasion may need softer abrasive materials, such as varnished surfaces, furniture surfaces, etc. Silica and alumina are fairly inert chemical compounds, and cannot be easily removed via a chemical reaction (as opposed to physical removal, which does not always allow for complete removal of abrasive particles) when a specific application requires it.

Oilfield operations can be used for the recovery of natural resources such as gas and/or oil, for example by drilling a wellbore down to the subterranean formation while circulating a drilling fluid in the wellbore. During oilfield operations (e.g., drilling operations), there can be accumulation of undesirable materials on wellbore surfaces, such as drill pipe surfaces, casing surfaces, etc. While emulsifiers can be employed to remove undesirable materials from wellbore surfaces, they are not always fully efficacious. Thus, an ongoing need exists for softer abrasive compositions that can be easily removed when a specific application requires it, and methods of making and using same.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are abrasive compositions and methods of making and using same. In an aspect, the abrasive composition can include a substrate selected from the group that includes at least a fibrous substrate, a sponge substrate, and combinations thereof and a plurality of calcium carbonate particles dispersed therein; wherein at least a portion of the plurality of calcium carbonate particles contact the substrate; wherein the fibrous substrate includes a plurality of fibers; wherein each fiber of the plurality of fibers is characterized by an aspect ratio of equal to or greater than about 2:1; wherein the sponge substrate is characterized by a porosity of equal to or greater than about 5 vol. %, based on the total volume of the sponge substrate; and wherein the abrasive composition is characterized by an abrasiveness that is greater than the abrasiveness of the substrate in the absence of the plurality of calcium carbonate particles. In some aspects, at least a portion of the calcium carbonate particles are bonded to the substrate via a physical bond; wherein the physical bond is selected from the group that includes at least electrostatic interaction, van der Waals interaction, ionic interaction, hydrogen bonding, dipole-dipole interaction, and combinations thereof. In other aspects, at least a portion of the calcium carbonate particles can be spatially confined within a substrate owing to the geometrical three-dimensional configuration (e.g., spatial structure) of the substrate relative to the geometrical three-dimensional configuration of the calcium carbonate particles.

Further disclosed herein are wellbore servicing fluids or compositions (collectively referred to herein as WSFs) and methods of using same; wherein the WSFs can include an abrasive composition as disclosed herein. In an aspect, the WSFs including abrasive compositions may be placed (e.g., pumped) in the wellbore and/or subterranean formation, where it may be allowed to contact a surface in the wellbore and/or subterranean formation, thereby abrading (e.g., mechanically removing all or a portion of) a material (e.g., undesirable material) on such surface to provide an abraded or cleaned surface. The surface in the wellbore and/or subterranean formation can include a wellbore surface, a wellbore equipment surface, a pipe surface, a casing surface, a subterranean formation surface, and the like, or combinations thereof.

In an aspect, an abrasive composition as disclosed herein can include a substrate selected from the group that includes at least a fibrous substrate, a sponge substrate, and combinations thereof and a plurality of calcium carbonate particles dispersed therein; wherein at least a portion of the plurality of calcium carbonate particles contact the substrate; wherein the fibrous substrate includes a plurality of fibers. For purposes of the disclosure herein, the term "abrasive" refers to a composition that can act to abrade (e.g., mechanically remove) a material (e.g., undesirable material) from any suitable surface to be abraded or cleaned (e.g., a surface in a wellbore and/or subterranean formation; a wooden surface; a furniture surface; a household surface; etc.).

In an aspect, the fibrous substrate can include a woven substrate, a nonwoven substrate, a sponge (e.g., a natural sponge), bulk fibers, and the like, or combinations thereof; wherein the fibrous substrate includes a plurality of fibers.

For purposes of the disclosure herein, the term "woven substrate" refers to substrates that were assembled from yarn, subsequent to forming the plurality of fibers into yarn; and the term "woven substrate" encompasses both weaved substrates as well as knitted substrates. In an aspect, the woven substrate including a plurality of fibers can be coated as disclosed herein with calcium carbonate particles to yield an abrasive composition including a woven coated substrate (e.g., a plurality of woven fibers coated with calcium carbonate particles).

Generally, nonwoven substrates (e.g., nonwoven fabrics) can include a plurality of fibers that are bonded together (e.g., held together) via a bonding process, such as mechanical bonding (e.g., fiber entanglement), chemical bonding (e.g., fibers can be chemically bonded together with adhesives or bonding agents), thermal bonding (e.g., fibers can be melted to adhere to each other), and the like, or combinations thereof. In an aspect, the nonwoven substrate including a plurality of fibers can be coated as disclosed herein with calcium carbonate particles to yield an abrasive composition including a nonwoven coated substrate (e.g., a plurality of nonwoven fibers coated with calcium carbonate particles).

Generally, bulk fibers refer to loose fibers that are not attached to each other in a three-dimensional structure (e.g., fibers that are not part of a woven substrate, fibers that are not part of a nonwoven substrate, fibers that are not part of a sponge, etc.). In some aspects, the fibrous substrate can include bulk fibers (e.g., a plurality of bulk fibers). In such aspects, the bulk fibers can be coated as disclosed herein with calcium carbonate particles to yield an abrasive composition including bulk coated fibers (e.g., a plurality of bulk fibers coated with calcium carbonate particles).

In an aspect, a natural sponge suitable for use as a substrate in the disclosure herein can include a plant sponge (e.g., a luffa sponge, a gourd sponge) and/or a sea sponge (i.e., fibrous skeleton of a sea sponge). Generally, plant sponges include cellulose fibers; and sea sponges include spongin fibers. As will be appreciated by one of skill in the art, and with the help of tis disclosure, natural sponges are fibrous in addition to being porous. For purposes of the disclosure herein, natural sponges can be considered both a fibrous substrate and a sponge substrate, owing to both including a plurality of fibers and being characterized by porosity. In an aspect, the natural sponge substrate including a plurality of fibers can be coated as disclosed herein with calcium carbonate particles to yield an abrasive composition including a natural sponge coated substrate (e.g., a plurality of sponge fibers coated with calcium carbonate particles).

In some aspects, the plurality of fibers can include natural fibers. Generally, natural fibers include cellulosic type fibers derived from plant materials, for example wood, wood pulp, cotton, sisal, jute, hemp, luffa; and/or fibers derived from animal materials, for example spongin fibers from sea sponges, protein fibers such as wool fibers and/or silk fibers, etc. For purposes of the disclosure herein, the term "natural fibers" refers to fibers that occur in nature.

In other aspects, the plurality of fibers can include synthetic fibers. For purposes of the disclosure herein, the term "synthetic fibers" refers to fibers that do not occur in nature. Synthetic fibers can include fibers that are produced from various chemical compounds, such as polymers, resins, etc.; and chemically treated fibers, such as chemically treated natural fibers (e.g., rayon fibers).

In yet other aspects, the plurality of fibers can include both natural fibers and synthetic fibers.

Nonlimiting examples of fibers suitable for use in the substrate in the present disclosure include cellulosic fibers, spongin fibers, protein fibers, wool fibers, silk fibers, rayon fibers, polymeric fibers, polyethylene fibers, high-density polyethylene fibers, polyethylene terephthalate fibers, polypropylene fibers, aramid fibers, Nylon 6,6 fibers, polyvinyl alcohol fibers, resin fibers, epoxy-based fibers, treated fibers, surface treated fibers, chemically treated fibers, plasma treated fibers, and the like, or combinations thereof.

In some aspects, the fibers can be treated fibers, for example surface treated fibers, chemically treated fibers, plasma treated fibers, and the like, or combinations thereof. Generally, fibers can be surface treated to promote fiber adhesion (e.g., bonding) and/or improve fiber properties, such as mechanical strength.

Each fiber of the plurality of fibers may be further characterized by any suitable aspect ratio. The aspect ratio of a fiber may be calculated by dividing the length of the fiber by the diameter of the fiber. In an aspect, each fiber of the plurality of fibers is characterized by an aspect ratio of equal to or greater than about 2:1, alternatively equal to or greater than about 5:1, alternatively equal to or greater than about 10:1, alternatively equal to or greater than about 25:1, alternatively equal to or greater than about 100:1, alternatively equal to or greater than about 500:1, alternatively equal to or greater than about 1,000:1, alternatively equal to or greater than about 10,000:1, or alternatively equal to or greater than about 100,000:1.

In an aspect, the substrate can include a sponge substrate, wherein the sponge substrate can be characterized by a porosity of equal to or greater than about 5 vol. %, alternatively equal to or greater than about 10 vol. %, alternatively equal to or greater than about 25 vol. %, alternatively equal to or greater than about 50 vol. %, alternatively equal to or greater than about 75 vol. %, alternatively equal to or greater than about 90 vol. %, alternatively from about 10 vol. % to about 99 vol. %, alternatively from about 51 vol. % to about 99 vol. %, or alternatively from about 90 vol. % to about 98 vol. %, based on the total volume of the sponge substrate; wherein the porosity may be determined by pycnometry/porosimetry. Generally, the porosity of a material is defined as the percentage of volume that the pores (i.e., voids, empty spaces) occupy based on the total volume of the material. The porosity of the sponge substrate may be determined using a porosity tester or porosimeter.

In an aspect, the sponge substrate can be coated as disclosed herein with calcium carbonate particles to yield an abrasive composition including a sponge coated substrate (e.g., a sponge substrate coated with calcium carbonate particles).

The sponge substrate can be further characterized by a pore size of equal to or greater than about 0.5 microns, alternatively equal to or greater than about 1 micron, alternatively equal to or greater than about 5 microns, alternatively equal to or greater than about 10 microns, alternatively equal to or greater than about 50 microns, alternatively equal to or greater than about 100 microns, alternatively equal to or greater than about 1,000 microns, alternatively equal to or greater than about 2,500 microns, alternatively from about 0.5 microns to about 5,000 microns, alternatively from about 1 micron to about 2,500 microns, or alternatively from about 10 microns to about 1,000 microns, for example as determined by dual beam focused ion beam/scanning electron microscopy (FIB/SEM) and image analysis. For purposes of the disclosure herein, the pore size refers to the largest dimension of any two-dimensional cross section through the pore.

In an aspect, the sponge substrate can be characterized by a specific surface area of from about 0.1 $m^2/g$ to about 1,000 $m^2/g$, alternatively from about 1 $m^2/g$ to about 500 $m^2/g$, or alternatively from about 10 m2/g to about 250 $m^2/g$, as determined by pycnometry.

In an aspect, the substrate can include an open-cell structure (as opposed to a closed-cell structure). Generally, an open-cell structure refers to a porous material including pores that are fluidly connected to each other. By contrast, a closed-cell structure refers to a porous material including pores that are not fluidly connected to each other, wherein the pores are completely enclosed by solid material. In an aspect, the substrate can be characterized by equal to or greater than about 5%, alternatively equal to or greater than about 10%, alternatively equal to or greater than about 25%, alternatively equal to or greater than about 50%, alternatively equal to or greater than about 75%, alternatively equal to or greater than about 90%, alternatively equal to or greater than about 99%, or alternatively about 100% open-cell structure, as determined by FIB/SEM and image analysis.

In some aspects, the sponge substrate can include a natural sponge as disclosed herein. In other aspects, the sponge substrate can include a synthetic sponge. For purposes of the disclosure herein, the term "synthetic sponge" refers to sponges that do not occur in nature. In yet other aspects, the sponge substrate can include both natural sponges and synthetic sponges.

Nonlimiting examples of synthetic sponges suitable for use as a substrate in the present disclosure include a polymeric sponge, a polyurethane sponge, a polyester sponge, and the like, or combinations thereof. As will be appreciated by one of skill in the art, and with the help of this disclosure, synthetic sponges are porous but not fibrous, while natural sponges are both porous and fibrous.

In an aspect, the plurality of calcium carbonate particles include calcite, aragonite, or both calcite and aragonite. Calcium carbonate ($CaCO_3$) displays three common naturally occurring crystal forms: aragonite, calcite, and vaterite.

Calcite is the most stable form of calcium carbonate, and displays a trigonal crystal system. Calcite defines a hardness of 3 on the Mohs hardness scale. Generally, the Mohs hardness scale is a qualitative measure of relative hardness and resistance to scratching between various minerals, wherein 10 different minerals define a scale hardness degree on the Mohs hardness scale; with talc defining a hardness of 1 (least hard) and diamond defining a hardness of 10 (hardest), and with calcite defining a hardness of 3 (harder than talc, less hard than diamond).

Aragonite displays an orthorhombic crystal system with acicular crystals (e.g., needle-like or rod-like crystals). Aragonite is characterized by a hardness of from about 3.5 to about 4 on the Mohs hardness scale. Without wishing to be limited by theory, aragonite may have an increased hardness as compared to calcite owing to a different crystal structure that presents acicular crystals.

Vaterite displays a hexagonal crystal system, and when contacted with water it converts to either calcite or aragonite, depending on the temperature (e.g., lower temperatures, such as ambient temperature (e.g., room temperature, a temperature of from about 15° C. to about 30° C.), can lead to calcite, while more elevated temperatures, for example over about 60° C.-70° C., can lead to aragonite).

In an aspect, the plurality of calcium carbonate particles is characterized by a hardness on the Mohs hardness scale of from about 3 to about 4, alternatively about 3, or alternatively from about 3.5 to about 4.

In an aspect, the plurality of calcium carbonate particles can be characterized by a particle size of equal to or greater than about 100 nm, alternatively equal to or greater than about 500 nm, alternatively equal to or greater than about 1 micron, alternatively equal to or greater than about 10 microns, alternatively equal to or greater than about 10 microns, alternatively equal to or greater than about 100 microns, or alternatively equal to or greater than about 1,000 microns. For purposes of the disclosure herein, the particle size refers to the largest dimension of any two-dimensional cross section through the particle. As will be appreciated by one of skill in the art, and with the help of this disclosure, and without wishing to be limited by theory, the size of the calcium carbonate particles in the abrasive composition can be controlled by adjusting reaction conditions used when making the calcium carbonate particles, such as amount of reagents present, reaction time, agitation parameters, reaction temperature, etc.

In an aspect, the plurality of calcium carbonate particles can be present in the abrasive composition in an amount of equal to or greater than about 5 wt. %, alternatively equal to or greater than about 10 wt. %, alternatively equal to or greater than about 25 wt. %, alternatively from about 5 wt. % to about 95 wt. %, alternatively from about 10 wt. % to about 80 wt. %, or alternatively from about 25 wt. % to about 75 wt. %, based on the total weight of the abrasive composition.

In an aspect, the abrasive composition can be characterized by an abrasiveness that is greater than the abrasiveness of the substrate in the absence of the plurality of calcium carbonate particles. For purposes of the disclosure herein, the term "abrasiveness" refers to how abrasive a particular material or composition is. The abrasiveness of a material or composition depends on the hardness of the material (e.g., fibrous substrate, sponge substrate) and/or abrasive particles (when present); on the size of material features (e.g., fibers, pores) and/or the size of abrasive particles (when present), and on the amount of material features and/or the amount of abrasive particles (when present). The support generally has a lower hardness (e.g., is a softer material) than the mineral particles (e.g., calcium carbonate particles), and as such the calcium carbonate particles enhance the abrasiveness of the support, thereby leading to the abrasive composition displaying increased abrasiveness when compared to the support. Further, the support generally has fewer and/or smaller features than the abrasive composition (e.g., the size of the fibers can be smaller than the size of the calcium carbonate particles; there can be less pores than mineral particles), and as such the calcium carbonate particles enhance the abrasiveness of the support, thereby leading to the abrasive composition displaying increased abrasiveness when compared to the support.

In some aspects, at least a portion of the calcium carbonate particles can be bonded to the substrate via a physical bond; wherein the physical bond is selected from the group that includes at least electrostatic interaction, van der Waals interaction, ionic interaction, hydrogen bonding, dipole-dipole interaction, and combinations thereof.

In other aspects, at least a portion of the calcium carbonate particles can contact the substrate and form an intimate mixture (i.e., abrasive composition), wherein the calcium carbonate particles are not bonded to the substrate via a physical bond. In such aspects, at least a portion of the calcium carbonate particles can be spatially confined within a substrate owing to the geometrical three-dimensional configuration (e.g., spatial structure) of the substrate relative to the geometrical three-dimensional configuration of the calcium carbonate particles. For example, calcium carbonate particles may be formed inside the pores of a substrate and/or between the fibers of a substrate, wherein the calcium carbonate particles are located inside the pores and/or between the fibers, respectively, in the substrate and are retained in the pores and/or between the fibers, respectively, by physical spatial confinement (as opposed to physical bonds). As will be appreciated by one of skill in the art, and with the help of this disclosure, spatially confined particles in the substrate can move freely inside a confinement space (e.g., within a pore, from one pore to another pore, within a space between fibers, from one space between fibers to another space between fibers, from inside the substrate to outside the substrate, etc.) under a suitable stimulus (e.g., applied force).

In an aspect, the abrasive composition as disclosed herein excludes silica (e.g., silica particles), alumina (e.g., alumina particles), titania (e.g., titania particles), and the like, or combinations thereof.

The abrasive composition as disclosed herein can be made by using any suitable methodology. In an aspect, a method of making an abrasive composition as disclosed herein can include contacting a calcium source, a carbonate source, water, and a substrate to form a reactant mixture.

Nonlimiting examples of a calcium source suitable for use in the present disclosure include a calcium salt, calcium chloride ($CaCl_2$), calcium hydroxide ($Ca(OH)_2$), calcium nitrite ($Ca(NO_2)_2$), calcium bromate ($Ca(BrO_3)_2$), calcium bromide ($CaBr_2$), calcium iodide ($CaI_2$), and the like, or combinations thereof. In an aspect, the calcium source can provide for at least a portion of the calcium in the calcium carbonate particles in the abrasive composition as disclosed herein. Without wishing to be limited by theory, the calcium source undergoes a chemical reaction to provide for at least a portion of the calcium in the calcium carbonate particles in the abrasive composition as disclosed herein, as will be discussed in more detail later herein.

Nonlimiting examples of a carbonate source suitable for use in the present disclosure include a carbonate, sodium carbonate ($Na_2CO_3$), sodium bicarbonate ($NaHCO_3$), potassium carbonate ($K_2CO_3$), ammonium carbonate (($NH_4)_2CO_3$), carbon dioxide ($CO_2$), and the like, or combinations thereof. In an aspect, the carbonate source can provide for at least a portion of the carbonate in the calcium carbonate particles in the abrasive composition as disclosed herein. Without wishing to be limited by theory, the carbonate source undergoes a chemical reaction to provide for at least a portion of the carbonate in the calcium carbonate particles in the abrasive composition as disclosed herein, as will be discussed in more detail later herein.

In an aspect, the carbon dioxide that can be used as a carbonate source for making the abrasive composition as disclosed herein can be a by-product of an industrial process, such as a flue gas, an off-gas, an exhaust gas, a purge gas, and the like, or combinations thereof. In such aspect, the abrasive composition can capture the carbon dioxide, thereby minimizing the carbon dioxide emissions of the industrial process producing the carbon dioxide.

Water present in the reactant mixture may be from any suitable source, examples of which include, but are not limited to, sea water, tap water, freshwater, water that is potable or non-potable, untreated water, partially treated water, treated water, produced water, city water, well-water, surface water, and the like, or combinations thereof.

In some aspects, a method of making an abrasive composition as disclosed herein can include contacting an aqueous solution of a calcium source, a carbonate source, a substrate, and optionally water to form a reactant mixture. In such aspects, at least a portion of the water in the reactant mixture can be water from the aqueous solution of a calcium source.

In other aspects, a method of making an abrasive composition as disclosed herein can include contacting a calcium source, an aqueous solution of a carbonate source, a substrate, and optionally water to form a reactant mixture. In such aspects, at least a portion of the water in the reactant mixture can be water from the aqueous solution of a carbonate source.

In yet other aspects, a method of making an abrasive composition as disclosed herein can include contacting an aqueous solution of a calcium source, an aqueous solution of a carbonate source, a substrate, and optionally water to form a reactant mixture. In such aspects, at least a portion of the water in the reactant mixture can be water from the aqueous solution of a calcium source and water from the aqueous solution of a carbonate source.

Water present in the aqueous solution of a calcium source and/or the aqueous solution of a carbonate source may be from any suitable source, examples of which include, but are not limited to, sea water, tap water, freshwater, water that is potable or non-potable, untreated water, partially treated water, treated water, produced water, city water, well-water, surface water, and the like, or combinations thereof.

In an aspect, the calcium source can be present in the aqueous solution of a calcium source in an amount of 1 µmol/L (µM) to a saturated amount (i.e., saturated solution) of calcium source in the aqueous solution, alternatively from about 1 mmol/L (mM) to about 1.5 mol/L (M), or alternatively from about 0.1 M to about 1 M.

In an aspect, the carbonate source can be present in the aqueous solution of a carbonate source in an amount of 1 µmol/L (µM) to a saturated amount (i.e., saturated solution) of carbonate source in the aqueous solution, alternatively from about 1 mmol/L (mM) to about 1.5 mol/L (M), or alternatively from about 0.1 M to about 1 M.

In aspects where the carbonate source includes carbon dioxide, the amount of carbon dioxide present in the reactant mixture can be carbon dioxide dissolved in water (i.e., aqueous solution of a carbonate source) and/or carbon dioxide introduced to the reactant mixture in gas phase. As will be appreciated by one of skill in the art, and with the help of this disclosure, and without wishing to be limited by theory, when carbon dioxide contacts water, a portion of carbon dioxide is dissolved in water (for example forming carbonic acid) and a portion of the carbon dioxide remains in gas phase (as gas bubbles) inside the carbon dioxide aqueous solution, wherein there is an equilibrium between the dissolved carbon dioxide in aqueous solution and the gas phase carbon dioxide in the aqueous solution, and wherein this equilibrium is highly dependent on the temperature and the pressure of the aqueous solution.

The components of the reactant mixture can be contacted with each other in any suitable order. For example, the calcium source and/or the carbonate source can be contacted with water to form the aqueous solution of a calcium source and/or the aqueous solution of a carbonate source, respectively; followed by contacting the aqueous solution of a calcium source and/or the aqueous solution of a carbonate source with the substrate, and optionally water (as necessary to provide for a desired concentration of the calcium source and/or carbonate source in the reactant mixture). As another example, the aqueous solution of a calcium source can be contacted with a substrate to form a first mixture; followed by contacting the first mixture with the carbonate source (e.g., contacting the first mixture with carbon dioxide, for example by bubbling carbon dioxide or pumping carbon dioxide into the first mixture) and/or the aqueous solution of a carbonate source (e.g., contacting the first mixture with an aqueous solution of sodium carbonate). As yet another example, the calcium source, the carbonate source, and water can be contacted to form a second mixture; followed by contacting the second mixture with the substrate.

In an aspect, a method of making an abrasive composition as disclosed herein can further include agitating the reactant mixture, or any components thereof; wherein agitating includes stirring, shaking, blending, mixing, gas bubbling, pumping, and the like, or combinations thereof.

In some aspects, all components of the reactant mixture can be contacted with each other; followed by agitating the reactant mixture. In other aspects, all components of the reactant mixture can be contacted with each other under agitation to form the reactant mixture In yet other aspects, two or more components of the reactant mixture can be contacted with each other under agitation. For example, the aqueous solution of a calcium source and/or the aqueous solution of a carbonate source can be formed by contacting water with the calcium source and/or the carbonate source, respectively, under agitation; wherein the aqueous solution of a calcium source and/or the aqueous solution of a carbonate source can be further contacted with a support and optionally water under agitation. As will be appreciated by one of skill in the art, and with the help of this disclosure, making aqueous solutions under agitation reduces the amount of time it takes for dissolving a solid component (e.g., calcium source, carbonate source) in water. Further, as will be appreciated by one of skill in the art, and with the help of this disclosure, and without wishing to be limited by theory, agitating the reactant mixture can provide for an increased reaction rate, as well as a more uniform crystal nucleation and growth.

In an aspect, a method of making an abrasive composition as disclosed herein can include allowing at least a portion of the reactant mixture to react and form a plurality of calcium carbonate particles in the presence of the substrate, thereby producing the abrasive composition and a spent aqueous solution including reaction byproducts. Without wishing to be limited by theory, the calcium source and the carbonate source react with each other and form calcium carbonate, which has a fairly low solubility in water, and thus the calcium carbonate precipitates out of the reactant mixture solution, for example by crystal nucleation and growth on a surface of the substrate.

For example, when the calcium source includes calcium chloride ($CaCl_2$) and the carbonate source includes sodium carbonate ($Na_2CO_3$), the reaction between the calcium source and the carbonate source in water in the presence of the substrate can be represented by equation (1):

$$CaCl_{2(aq)} + Na_2CO_{3(aq)} + substrate_{(s)} \rightarrow substrate\text{-}CaCO_{3(s)} + 2NaCl_{(aq)} \quad (1)$$

wherein "aq" denotes an aqueous solution; wherein "s" denotes a solid; and wherein the term "substrate-$CaCO_{3(s)}$" is the abrasive composition as disclosed herein. The spent aqueous solution may include sodium chloride (NaCl), and optionally unreacted calcium chloride and/or unreacted sodium carbonate.

As another example, when the calcium source includes calcium bromide ($CaB_2$) and the carbonate source includes sodium bicarbonate ($NaHCO_3$), the reaction between the calcium source and the carbonate source in water in the presence of the substrate can be represented by equation (2):

$$CaBr_{2(aq)} + 2NaHCO_{3(aq)} + substrate_{(s)} \rightarrow substrate\text{-}CaCO_{3(s)} + CO_{2(g)} + H_2O_{(l)} + 2NaBr_{(aq)} \quad (2)$$

wherein "g" denotes a gas; and wherein "l" denotes a liquid. The spent aqueous solution may include sodium bromide (NaBr), dissolved carbon dioxide (and/or carbonic acid), and optionally unreacted calcium bromide and/or unreacted sodium bicarbonate.

As yet another example, when the calcium source includes calcium hydroxide ($Ca(OH)_2$) and the carbonate source includes carbon dioxide ($CO_2$), the reaction between the calcium source and the carbonate source in water in the presence of the substrate can be represented by equation (3):

$$Ca(OH)_{2(aq)} + CO_{2(g)} + substrate_{(s)} \rightarrow substrate\text{-}CaCO_{3(s)} + H_2O_{(l)} \quad (3)$$

As will be appreciated by one of skill in the art, and with the help of this disclosure, an aqueous solution of calcium hydroxide (i.e., $Ca(OH)_{2(aq)}$) is also known as limewater. The spent aqueous solution may include dissolved carbon dioxide (and/or carbonic acid) and/or unreacted calcium hydroxide.

In an aspect, at least a portion of the calcium carbonate particles form by calcium carbonate crystal nucleation and growth on a surface of the substrate. As will be appreciated by one of skill in the art, and with the help of this disclosure, and without wishing to be limited by theory, when the calcium carbonate forms as a result of the chemical reaction between the calcium source and the carbonate source, and owing to the low solubility of calcium carbonate in water, the calcium carbonate will accumulate as a solid phase (e.g., precipitate), wherein solid calcium carbonate crystals can nucleate and grow on a surface of the substrate (as opposed to growing in solution as suspended particles). Generally, crystallization (i.e., formation of crystals of a certain chemical compound or material) includes a first step, which is the crystal nucleation, followed by a second step, which is the crystal growth; wherein during crystal nucleation critical size crystals are formed, and wherein during crystal growth the crystals grow larger than the critical size crystals. Crystals smaller than the critical size crystals can easily dissolve and return to solution; while crystals larger than the critical size can remain in solid phase. Crystals having the critical size can either dissolve and return to solution, or grow larger and/or remain in solid phase. Generally, the nucleation of crystals on a foreign surface or substrate (i.e., a substrate having a composition and/or chemical formula different than the growing crystal) can be referred to as "heterogeneous nucleation" (as opposed to "homogeneous nucleation" which refers to crystal nucleation as particles suspended in a solution). The nucleation of calcium carbonate crystals on a surface of the substrate (e.g., foreign surface) is heterogeneous nucleation. Without wishing to be limited by theory, the interfacial energy between a crystal nucleus (e.g., calcium carbonate crystal nucleus) and a solid substrate (e.g., a substrate as disclosed herein) is usually lower than the interfacial energy of the crystal in contact with the solution, thereby promoting the heterogeneous crystal nucleation on a surface of the substrate (as opposed to in solution). Further, and without wishing to be limited by theory, the molecules in the crystal (e.g., calcium carbonate molecules in the calcium carbonate crystal) can form bonds with the molecules in the substrate (e.g., cellulose molecules), wherein such bonds are stronger than the bonds of solvation (e.g., solvation bonds between water and calcium carbonate); thereby promoting crystal (e.g., calcium carbonate crystal) nucleation and growth on a surface of the substrate.

For purposes of the disclosure herein, the fully grown calcium carbonate crystals are referred to as calcium carbonate particles, and the terms "calcium carbonate crystals" and "calcium carbonate particles" can be used interchangeably.

In an aspect, at least a portion of the calcium carbonate particles are bonded to the substrate via a physical bond; wherein the physical bond is selected from the group that includes at least electrostatic interaction, van der Waals interaction, ionic interaction, hydrogen bonding, dipole-dipole interaction, and combinations thereof. As will be appreciated by one of skill in the art, and with the help of this disclosure, in "substrate-$CaCO_{3(s)}$" the bond "—" between the substrate and the $CaCO_3$ particles does not depict a covalent bond; the bond "—" between the substrate and the $CaCO_3$ particles depicts a physical bond between the substrate and the $CaCO_3$ particles.

In an aspect, a method of making an abrasive composition as disclosed herein can further include heating the reactant mixture to a temperature of from about 30° C. to about 95° C., alternatively less than about 70° C., alternatively less than about 65° C., alternatively less than about 60° C., alternatively less than about 55° C., alternatively from about 30° C. to less than about 70° C., alternatively from about 30° C. to about 65° C., alternatively from about 35° C. to about 60° C., alternatively from about 40° C. to about 55° C., alternatively equal to or greater than about 70° C., alternatively equal to or greater than about 75° C., alternatively equal to or greater than about 80° C., alternatively from about 70° C. to about 95° C., alternatively from about 75° C. to about 95° C., or alternatively from about 80° C. to about 95° C. The reactant mixture can be heated by using any suitable methodology (e.g., a heater, a heat exchanger, a fired heater, a burner, a heating mantle, a heating element, etc.).

Without wishing to be limited by theory, the solubility of calcium carbonate in water decreases with increasing the temperature, and as such heating the reactant mixture promotes the formation of solid calcium carbonate, thereby enhancing the calcium carbonate crystallization (i.e., precipitation) process.

In aspects where the reactant mixture is not heated or the reactant mixture is heated to less than about 70° C., at least a portion of the plurality of calcium carbonate particles of the abrasive composition can include calcite. In aspects where the reactant mixture is heated to equal to or greater than about 70° C., at least a portion of the plurality of calcium carbonate particles of the abrasive composition can include aragonite.

In an aspect, a method of making an abrasive composition as disclosed herein can further include recovering the abrasive composition from the spent aqueous solution. The spent aqueous solution can include reaction byproducts (i.e., any reaction products other than calcium carbonate; such as salts, water, carbon dioxide, etc.), as well as unreacted calcium source and/or unreacted carbonate source. The abrasive composition can be separated from the spent aqueous solution by using any suitable methodology that can separate a solid (i.e., the abrasive composition) from a liquid (i.e., the spent aqueous solution). For example, the abrasive composition can be separated from the spent aqueous solution by filtration, decanting, centrifugation, sedimentation, and the like, or combinations thereof.

In an aspect, a method of making an abrasive composition as disclosed herein can further include drying the recovered abrasive composition. The abrasive composition can be dried by using any suitable methodology. For example, the abrasive composition can be dried at ambient temperature (e.g., by allowing any water entrained in the recovered abrasive composition to evaporate). As another example, the abrasive composition can be dried by heating the abrasive composition at a temperature of from about 30° C. to about 100° C. (e.g., oven drying, vacuum oven drying).

In an aspect, a method of making an abrasive composition as disclosed herein can include (i) contacting a calcium chloride aqueous solution, a sodium carbonate aqueous solution, and a cellulosic substrate (e.g., cellulose fibers, paper, etc.) under agitation to form a reactant mixture; and (ii) allowing at least a portion of the reactant mixture to react and form a plurality of calcium carbonate particles in the presence of the cellulosic substrate, thereby producing the abrasive composition. In aspects where the reactant mixture is allowed to react at ambient temperature (e.g., room temperature, a temperature of from about 15° C. to about 30° C.) or at a temperature of less than about 70° C., the abrasive composition includes calcite particles. In aspects where the reactant mixture is heated to equal to or greater than about 70° C., the abrasive composition includes aragonite particles.

In an aspect, a method of making an abrasive composition as disclosed herein can include (i) contacting limewater (i.e., a calcium hydroxide aqueous solution), carbon dioxide, and a cellulosic substrate (e.g., cellulose fibers, paper, etc.) to form a reactant mixture, wherein the carbon dioxide is bubbled through the limewater containing the cellulosic substrate, wherein the carbon dioxide bubbling provides for agitating the reactant mixture, and wherein the reactant mixture can be optionally stirred in addition to bubbling gas through; and (ii) allowing at least a portion of the reactant mixture to react and form a plurality of calcium carbonate particles in the presence of the cellulosic substrate, thereby producing the abrasive composition. In aspects where the reactant mixture is allowed to react at ambient temperature (e.g., room temperature, a temperature of from about 15° C. to about 30° C.) or at a temperature of less than about 70° C., the abrasive composition includes calcite particles. In aspects where the reactant mixture is heated to equal to or greater than about 70° C., the abrasive composition includes aragonite particles.

In an aspect, a method of making an abrasive composition as disclosed herein can further include sizing the abrasive composition by using any suitable methodology. In aspects where the substrate is used in the reactant mixture in a desired size (e.g., a desired size for a particular application), it may not be necessary to size the abrasive composition. In aspects where the substrate is used in the reactant mixture in size other than a desired size (e.g., a desired size for a particular application), it may be necessary to size the abrasive composition. The abrasive composition and/or the substrate may be sized by mechanically sizing, chopping, grinding, milling, shredding, cutting, and the like, or combinations thereof. The abrasive composition suitable for use in the present disclosure includes abrasive composition particles of any suitable geometry, including without limitation swatches, patches, plates, beads, spheres, ovals, fibers, rods, pellets, platelets, disks, ribbons, and the like, or combinations thereof. The abrasive composition suitable for use in the present disclosure includes abrasive composition particles of any suitable size. For example, abrasive composition particles may have a size of less than about 100 microns when deposited on a paper (e.g., paper towel) substrate for cleaning purposes. As another example, abrasive composition particles may have a size of less than about 500 microns when deposited on a sponge substrate for wellbore cleaning purposes. As yet another example, abrasive composition particles may have a size of from about 1 micron to about 20 microns when deposited on a substrate for varnish polishing purposes.

In an aspect, the abrasive composition as disclosed herein can be formed into a variety of articles. For example, the abrasive composition as disclosed herein can be formed into a household cleaning item, a towel, a paper towel, a sponge; a polishing item, a surface finishing item, a wood finishing item, an item for polishing between finishing coats; a filter; an $H_2S$ scrubber; a lost circulation material; a wellbore cleaning item, a wellbore equipment cleaner, a drill pipe cleaner, a casing cleaner, a wellbore surface cleaner, a subterranean surface cleaner; and the like; or combinations thereof.

In an aspect, the abrasive composition as disclosed herein can be formed into an article suitable for use in a wellbore servicing operation, for example a lost circulation material; a wellbore cleaning item, a wellbore equipment cleaner, a drill pipe cleaner, a casing cleaner, a wellbore surface cleaner, a subterranean surface cleaner; and the like; or combinations thereof.

An abrasive composition of the type disclosed herein may be included in any suitable wellbore servicing fluid (WSF). As used herein, a "servicing fluid" or "treatment fluid" refers generally to any fluid that may be used in a subterranean application in conjunction with a desired function and/or for a desired purpose, including but not limited to fluids used to drill, complete, work over, fracture, repair, clean, or in any way prepare a wellbore for the recovery of materials residing in a subterranean formation penetrated by the wellbore. The servicing fluid is for use in a wellbore that penetrates a subterranean formation. It is to be understood that "subterranean formation" encompasses both areas below exposed earth and areas below earth covered by water such as ocean or fresh water. In an aspect, the WSF including an abrasive composition as disclosed herein can include a drilling fluid, a completion fluid, or a clean-up fluid.

In an aspect, the abrasive composition as disclosed herein may be included within the WSF in a suitable or effective amount (e.g., an amount effective to provide desired abrasive properties to the WSF). The resultant amount of abrasive composition that is necessary to impart desired abrasive properties to a WSF may be dependent upon a variety of factors such as the composition of the WSF; the type of substrate present in the abrasive composition; the presence or absence of various additives in the WSF; the intended wellbore location where the WSF is expected to be used to abrade a material on a surface; the dimensions of the abrasive composition (e.g., size of abrasive composition particles); the composition of the formation; the pressure of the formation; the diameter of the hole; and the like; or combinations thereof. In an aspect, an abrasive composition as disclosed herein may be present within the WSF in an amount of from about 10 vol. % to about 40 vol. %, alternatively from about 12.5 vol. % to about 37.5 vol. %, or alternatively from about 15 vol. % to about 35 vol. %, based on the total volume of the WSF.

In an aspect, the WSF includes a base fluid. In some aspects, the base fluid is an aqueous-based fluid. In other aspects, the base fluid is an oil-based fluid. In yet other aspects, the base fluid includes an emulsion or an invert emulsion.

In an aspect, the base fluid includes an aqueous-based fluid. Aqueous-based fluids that may be used in the WSF include any aqueous fluid suitable for use in subterranean applications, provided that the aqueous-based fluid is compatible with the abrasive composition used in the WSF. For example, the aqueous-based fluid may include water or a brine. In an aspect, the aqueous-based fluid includes an aqueous brine. In such aspect, the aqueous brine generally includes water and an inorganic monovalent salt, an inorganic multivalent salt, or both. The aqueous brine may be naturally occurring or artificially-created. Water present in the brine may be from any suitable source, examples of which include, but are not limited to, sea water, tap water, freshwater, water that is potable or non-potable, untreated water, partially treated water, treated water, produced water, city water, well-water, surface water, liquids including water-miscible organic compounds, and combinations thereof. The salt or salts in the water may be present in an amount ranging from greater than about 0% by weight to a saturated salt solution, alternatively from about 1 wt. % to about 30 wt. %, or alternatively from about 5 wt. % to about 10 wt. %, based on the weight of the salt solution. In an aspect, the salt or salts in the water may be present within the base fluid in an amount sufficient to yield a saturated brine. As will be appreciated by one of skill in the art, and with the help of this disclosure, the type and concentration of salt solutions utilized as a base fluid is dependent on the WSF density (e.g., drilling fluid density, completion fluid density, clean-up fluid density, etc.), which may range from about 8 lb/gallon to about 20 lb/gallon, alternatively from about 10 lb/gallon to about 18 lb/gallon, or alternatively from about 12 lb/gallon to about 16 lb/gallon.

Nonlimiting examples of aqueous brines suitable for use in the present disclosure include chloride-based, bromide-based, phosphate-based or formate-based brines containing monovalent and/or polyvalent cations, salts of alkali and alkaline earth metals, or combinations thereof. Additional examples of suitable brines include, but are not limited to brines including NaCl, KCl, NaBr, $CaCl_2$, $CaBr_2$, $ZnBr_2$, ammonium chloride ($NH_4Cl$), potassium phosphate, sodium formate, potassium formate, cesium formate, ethyl formate, methyl formate, methyl chloro formate, triethyl orthoformate, trimethyl orthoformate, or combinations thereof. In an aspect, the base fluid includes a brine.

In an aspect, the base fluid includes an oil-based fluid, such as for example an oleaginous fluid. Oleaginous fluids that may be used in the WSF include any oleaginous fluid suitable for use in subterranean applications, provided that the oleaginous fluid is compatible with the abrasive composition used in the WSF. Examples of oleaginous fluids suitable for use in a WSF include, but are not limited to, petroleum oils, natural oils, synthetically-derived oils, oxygenated fluids, or combinations thereof. In an aspect, the oleaginous fluid includes diesel oil, kerosene oil, mineral oil, synthetic oils, aliphatic hydrocarbons, polyolefins (e.g., alpha olefins, linear alpha olefins and/or internal olefins), paraffins, silicone fluids, polydiorganosiloxanes, oxygenated solvents, esters, diesters of carbonic acid, alcohols, alcohol esters, ethers, ethylene glycol, ethylene glycol monoalkyl ether, ethylene glycol dialkyl ether, or combinations thereof, wherein the alkyl groups are methyl, ethyl, propyl, butyl, and the like.

In an aspect, the base fluid includes an emulsion. In such aspect, the emulsion is an oil-in-water emulsion including a non-oleaginous (e.g., an aqueous-based fluid of the type previously described herein) continuous phase and an oleaginous (e.g., an oil-based fluid of the type previously described herein) discontinuous phase.

In another aspect, the base fluid includes an invert emulsion. In such aspect, the invert emulsion is a water-in-oil emulsion including an oleaginous (e.g., an oil-based fluid of the type previously described herein) continuous phase and a non-oleaginous (e.g., an aqueous-based fluid of the type previously described herein) discontinuous phase.

The base fluid may be present within the WSF in an amount of from about 20 vol. % to about 60 vol. %, alternatively from about 25 vol. % to about 55 vol. %, or alternatively from about 30 vol. % to about 50 vol. %, based on the total volume of the WSF. Alternatively, the base fluid may include the balance of the WSF after considering the amount of the other components used.

The WSF may further include additional additives as deemed appropriate for improving the properties of the fluid. Such additives may vary depending on the intended use of the fluid in the wellbore. Examples of such additives include, but are not limited to suspending agents, density reducing additives, settling prevention agents, expansion additives, clays, salts, accelerants, set retarders, lignosulfonates, defoamers, surfactants, dispersing agents, fluid loss control agents, weighting materials, dispersants, fillers, zeolites, barite, calcium sulfate, silica flour, sand, slag, vitrified shale, fly ash, pozzolanic ash, lime, formation conditioning agents, fluid absorbing materials, resins, aqueous superabsorbers, viscosifying agents, gelling agents, crosslinkers, mechanical property modifying additives, elastomers, styrene-butadiene copolymers, conventional reinforcing materials, carbon fibers, glass fibers, metal fibers, minerals fibers, and the like, or combinations thereof. These additives may be introduced singularly or in combination using any suitable methodology and in amounts effective to produce the desired improvements in the properties of the WSF before and after hardening of the WSF. As will be appreciated by one of skill in the art with the help of this disclosure, any of the components and/or additives used in the WSF have to be compatible with the abrasive composition used in the WSF composition. For example, if the pH of the WSF (e.g., a WSF including an aqueous-based fluid) falls below about 4 (e.g., a pH of less than about 4, alternatively less than about 3, or alternatively less than about 2), a significant amount of calcium carbonate particles in the abrasive composition may be dissolved, thereby reducing the abrasiveness of the abrasive composition. Further, and as will be appreciated by one of skill in the art with the help of this disclosure, any suitable additives/components may be used in the WSF, and each additive/component of the WSF may perform more than one function (e.g., an abrasive composition including bulk coated fibers may be a cleaning material as well as a filler or bulk filler).

In an aspect, the WSF can include an abrasive composition of a suitable size as required by a specific wellbore servicing operation. For example, the abrasive composition in the WSF has to meet specific size requirements. For example, the WSF including the abrasive composition has to be a pumpable fluid, wherein the WSF including the abrasive composition can be pumped through various pumping components (e.g., suction and discharge valves of pumps, elbows, tees, etc.).

In an aspect, the abrasive composition in the WSF can include abrasive composition particles of a size suitable for including in the WSF. The abrasive composition particles can have any suitable geometry and/or size, as required by a specific wellbore servicing operation. In an aspect, the abrasive composition suitable for use in the WSF of the present disclosure includes abrasive composition particles of any suitable geometry, including without limitation swatches, patches, plates, beads, spheres, ovals, fibers, rods, pellets, platelets, disks, ribbons, and the like, or combinations thereof. In an aspect, the abrasive composition particles can be characterized by any suitable abrasive composition particle size, such as less than about 2 inches, alternatively less than about 1.5 inches, alternatively less than about 1 inch, alternatively less than about 0.5 inches, alternatively less than about 0.1 inches, or alternatively less than about 0.01 inches. As will be appreciated by one of skill in the art, and with the help of this disclosure, abrasive composition particles having a size of equal to or greater than about 500 microns can be removed from a WSF with a shale shaker (or any other suitable solids control device), for example, along with the cuttings present in the fluid. For purposes of the disclosure herein, the abrasive composition particle size refers to the largest dimension of any two-dimensional cross section through the abrasive composition particle.

In an aspect, the abrasive composition and/or the substrate may be sized prior to preparing the WSF, for example by mechanically sizing, chopping, grinding, milling, shredding, cutting, and the like, or combinations thereof, to yield an abrasive composition suitable for use in a WSF.

In some aspects, the fibrous substrate including bulk fibers and/or the abrasive composition including bulk coated fibers can be sized prior to preparing the WSF, for example by cutting and/or chopping longer fibers (e.g., longer bulk fibers and/or bulk coated fibers, respectively) into fibers of a desired or required size (e.g., length). The bulk coated fibers having a desired size (as appropriate for and/or required by a specific wellbore servicing operation) can be added to the WSF, for example via blending during preparing the WSF as disclosed herein.

In an aspect, a method of servicing a wellbore in a subterranean formation can include preparing a WSF including a base fluid and an abrasive composition as disclosed herein.

In an aspect, the WSF including the abrasive composition as disclosed herein may be prepared using any suitable method or process. The components of the WSF (e.g., abrasive composition, base fluid, additives, etc.) may be combined and mixed in by using any mixing device compatible with the composition, e.g., a mixer, a batch mixer, a batch mixer with impellers and/or paddles, a blender, a batch blender, single ribbon type blenders, double ribbon type blenders, horizontal blenders, vertical blenders, inclined blenders, single or double ribbon type blenders which could further be horizontal, vertical or inclined, mixing eductors, dry powder eductors, dry powder eductor with centrifugal pump followed by circulation loop, cyclone-type dry to liquid mixer, inline static mixers, and the like, or any suitable combination thereof.

In an aspect, the components of the WSF are combined at the well site; alternatively, the components of the WSF are combined off-site and are transported to and used at the well site. The resulting WSF may be pumped downhole where it may function as intended (e.g., abrade a material on a surface in the wellbore and/or subterranean formation).

As it will be appreciated by one of ordinary skill in the art and with the help of this disclosure, a WSF including an abrasive composition as disclosed herein may be used for abrading (e.g., mechanically removing) a material on a surface in the wellbore and/or subterranean formation in any suitable stage of a wellbore's life, such as for example, during a drilling operation, completion operation, production stage, clean-up operation, etc.

In an aspect, a WSF including an abrasive composition as disclosed herein may be circulated in a wellbore and/or subterranean formation to abrade (e.g., mechanically remove) a material on a surface in the wellbore and/or subterranean formation (e.g., to clean a surface in the wellbore and/or subterranean formation).

Nonlimiting examples of a surface in the wellbore and/or subterranean formation include a wellbore surface, a wellbore equipment surface, a pipe surface, a casing surface, a subterranean formation surface, and the like, or combinations thereof.

In an aspect, a method of servicing a wellbore in a subterranean formation can include (i) placing the WSF in the wellbore and/or subterranean formation; and (ii) allowing at least a portion of the abrasive composition to abrade (e.g., mechanically remove) a material on a surface in the wellbore and/or subterranean formation.

In an aspect, the WSF including the abrasive composition as disclosed herein may be utilized in a drilling and completion operation.

In an aspect, the WSF including the abrasive composition as disclosed herein is a drilling fluid. A drilling fluid, also known as a drilling mud or simply "mud," is a fluid that is circulated through a wellbore while the wellbore is being drilled to facilitate the drilling operation. Generally, a drilling fluid can carry cuttings up from downhole and around a drill bit, transport them up an annulus, and allow their separation, followed by recycling the drilling fluid to the drilling operation. Further, a drilling fluid can cool and lubricate the drill bit, as well as reduce friction between a drill string and the sides of the wellbore hole. Furthermore the drilling fluid aids in support of a drill pipe and drill bit, and provides a hydrostatic pressure necessary to maintain the integrity of the wellbore walls and prevent well blowouts. Solids contained in the drilling fluid may accumulate on a surface in the wellbore and/or subterranean formation (e.g., a drill pipe surface, a casing surface, etc.). Debris, such as solids, mud, etc., left in the wellbore and/or the subterranean formation (e.g., material deposited on a surface in the wellbore and/or the subterranean formation) can have an adverse effect on several aspects of a well's completion and production stages, from inhibiting the performance of downhole tools to inducing formation damage and plugging production tubing. Accordingly, concurrent with and/or subsequent to drilling operations where an undesirable material is deposited on a downhole surface, the undesirable material or a portion thereof may need to be removed from the wellbore and/or the subterranean formation; for example via abrasion with an abrasive composition of the type disclosed herein in the drilling fluid. In an aspect, the abrasive composition in the drilling fluid (e.g., abrasive composition particles) can provide for abrading (e.g., mechanically removing) at least a portion of the undesirable material deposited on such surface. Depending on the size of the abrasive composition particles, the abrasive composition may be removed from the drilling fluid along with the cuttings, followed by separating the abrasive composition from the cuttings, and recycling the abrasive composition to the drilling fluid (or any other suitable WSF), wherein the drilling fluid can be reintroduced to the wellbore during the drilling operation. For example, a drilling fluid may include abrasive composition particles having a size of less than about 5,000 microns, alternatively less than about 2,500 microns, or alternatively less than about 1,000 microns.

In an aspect, the WSF including the abrasive composition as disclosed herein is a completion fluid. In an aspect, when desired (for example, upon the cessation of drilling operations and/or upon reaching a desired depth), the wellbore or a portion thereof may be prepared for completion. In an aspect, the method of using a WSF including an abrasive composition of the type disclosed herein (e.g., a completion fluid including an abrasive composition) may include completing the wellbore. Generally, completion fluids are free of solids; however, an abrasive composition (e.g., abrasive composition particles) may be introduced in a completion fluid and into the wellbore and/or subterranean formation to aid in cleaning surfaces in the wellbore and/or subterranean formation prior to initiation of production. Generally, a completion fluid is placed in the well to facilitate final operations prior to initiation of production, such as setting screens, production liners, packers, downhole valves, etc. The wellbore, or a portion thereof, may be completed by providing a casing string within the wellbore and cementing or otherwise securing the casing string within the wellbore. In such an aspect, the casing string may be positioned (e.g., lowered into) the wellbore to a desired depth prior to, concurrent with, or following provision of the completion fluid including an abrasive composition, and/or abrading of material deposited on a surface in the wellbore and/or subterranean formation. The completion fluid may be displaced from the wellbore by pumping a flushing fluid, a spacer fluid, and/or a suitable cementitious slurry downward through an interior flowbore of the casing string and into an annular space formed by the casing string and the wellbore walls. When the cementitious slurry has been positioned, the cementitious slurry may be allowed to set. In some aspects, the abrasive composition may be recovered from the completion fluid recovered from the wellbore, wherein the abrasive composition may be recycled to any suitable WSF. In some aspects, a completion fluid may include abrasive composition particles having a size of less than about 5,000 microns, alternatively less than about 2,500 microns, or alternatively less than about 1,000 microns.

In an aspect, the WSF including the abrasive composition as disclosed herein may be utilized in a clean-up operation. In an aspect, the WSF including the abrasive composition as disclosed herein is a clean-up fluid. A clean-up fluid can be generally used downhole during clean-up activities of the well, such as any suitable treatment to remove material obstructing the flow of desired material (e.g., oil, gas, etc.) from the subterranean formation (e.g., to prepare a wellbore for completion and/or production). Clean-up operations can employ a clean-up fluid including the abrasive composition as disclosed herein for the removal of drilling debris and/or drilling fluids, for example to prepare a well for completion, as previously described herein. Alternatively, clean-up operations can employ a clean-up fluid including the abrasive composition as disclosed herein following a stimulation treatment, such as gravel packing and/or hydraulic fracturing; wherein the clean-up fluid including the abrasive composition can provide for the removal of material deposited on a surface in the wellbore and/or subterranean formation (e.g., caked mud) as a result of the stimulation operation, wherein such deposited material can decrease production by obstructing the flow of desired fluids. The clean-up fluid can be recovered from the wellbore and/or subterranean formation upon completion of the clean-up operations, wherein the abrasive composition may be recovered from the recovered clean-up fluid, and wherein the abrasive composition may be recycled to any suitable WSF. In some aspects, a clean-up fluid may include abrasive composition particles having a size of up to 1-2 inches, alternatively less than about 2 inches, alternatively less than about 1.5 inches, alternatively less than about 1 inch, or alternatively less than about 0.5 inches.

In an aspect, the abrasive composition and methods of making and using same as disclosed herein may display advantages when compared with conventional abrasive compositions. Generally, abrasive particles from conventional abrasive compositions cannot be easily removed, should a particular application require the removal of the abrasive particles subsequent to employing the abrasive composition, owing to conventional abrasive particles including silica, alumina, titania, and the like, or combinations thereof. By contrast, calcium carbonate particles in the abrasive compositions disclosed herein can be removed, for example, by contact with mildly acidic or acidic solutions.

In an aspect, the abrasive composition as disclosed herein may be advantageously employed as a household cleaning product and/or an industrial cleaning product. The abrasive composition as disclosed herein can be advantageously considered non-toxic, owing to including cellulosic substrates and calcium carbonate (which can be used as an ingredient in antacids).

In an aspect, the abrasive composition as disclosed herein may be advantageously employed for finishing or buffing surfaces (e.g., furniture surfaces); for preparing surfaces (e.g., furniture surfaces) to receive coatings (e.g., a varnish coating); for mechanically removing (e.g., abrading) an undesired material from a surface (e.g., dirt removal from a household surface, undesired material removal from a wellbore and/or subterranean formation surface); and the like; or combinations thereof.

In an aspect, the abrasive composition as disclosed herein may be advantageously employed in a servicing fluid in the performance of one or more wellbore servicing operations, for example drilling operations, completion operations, clean-up operations, etc., as disclosed herein.

While the current disclosure is discussed in detail in the context of employing the abrasive composition to abrade an undesired material from a surface, it should be understood that the abrasive composition as disclosed herein can be advantageously employed in any suitable application, provided that the abrasive composition is compatible with the materials and methods in such application. For example, the abrasive composition as disclosed herein may be advantageously employed in a $H_2S$ scrubber, for example by using an abrasive composition including a filter substrate and calcium carbonate particles, wherein the filter substrate provides a three-dimensional structure or scaffold for the calcium carbonate particles, thereby allowing for a $H_2S$-containing gas to flow through the abrasive composition, wherein the $H_2S$ can be removed by contact and reaction with the calcium carbonate, while allowing the rest of the gas to pass through the abrasive composition. As another example, the abrasive composition as disclosed herein may be advantageously employed as a lost circulation material in a wellbore servicing operation, wherein the size of the abrasive composition particles can be advantageously adjusted in accordance with the requirements of the wellbore servicing operation.

In an aspect, a method of making the abrasive composition as disclosed herein can advantageously provide for reducing plant emissions into the environment, for example by utilizing carbon dioxide produced in the plant as the carbonate source. Additional advantages of the abrasive composition and methods of making and using same may be apparent to one of skill in the art viewing this disclosure.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

Figure 1A:
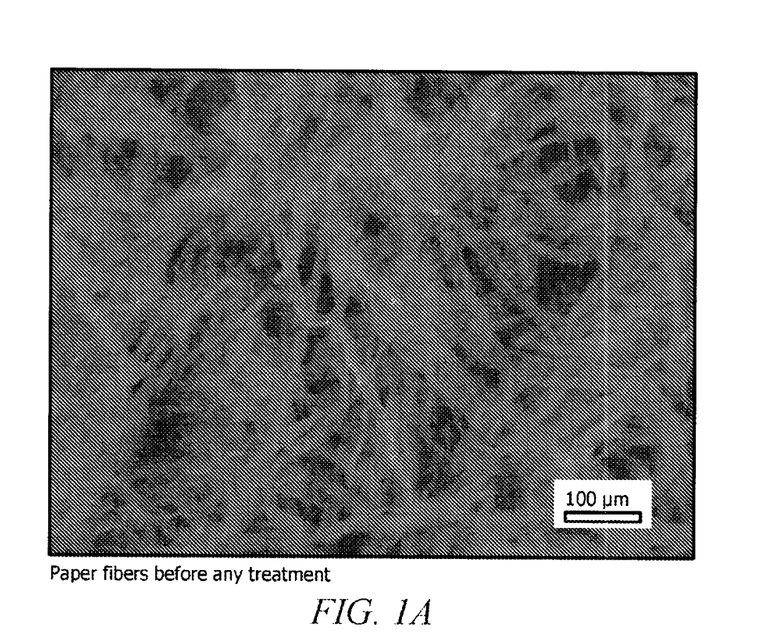
FIGS. 1A and 1B display pictures of paper fibers before and after calcium carbonate particles deposition on the fibers, respectively.
Figure 1B:
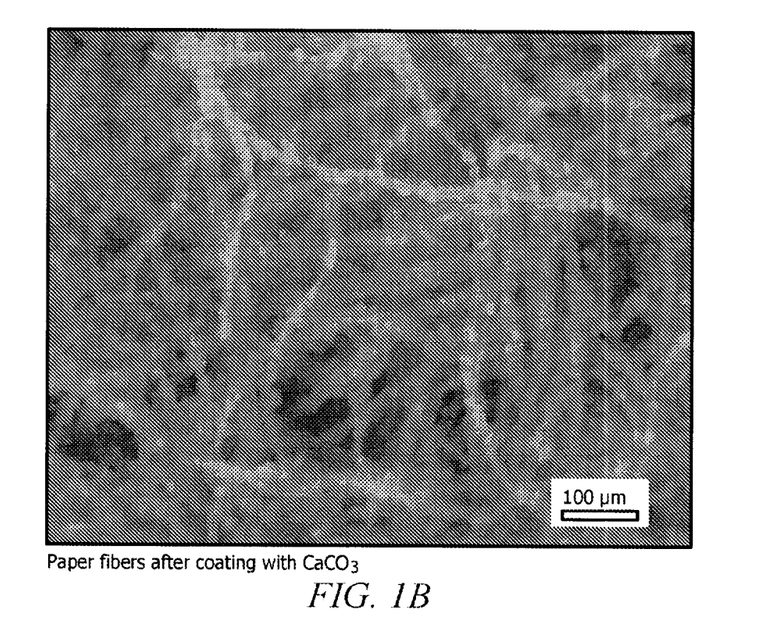

The abrasive properties of various abrasive compositions were investigated. More specifically, the abrasive properties of abrasive compositions prepared by two different methods using a cellulosic substrate (i.e., paper) were investigated, as follows. FIG. 1A displays the paper fibers in the substrate prior to calcium carbonate deposition on the substrate. The pictures in FIGS. 1A and 1B were taken via digital microscopy (Discovery VMS-004 Delux).

A method of preparing the abrasive composition as disclosed herein entailed combining a calcium chloride aqueous solution with a sodium carbonate aqueous solution in the presence of a paper substrate (e.g., cellulose fibers). For the calcium carbonate particles displayed in FIG. 1B, the reaction was conducted at room temperature where calcite is expected to form. Typically, paper substrates (Scott multipurpose paper towels) having a rectangular shape with a size of about 2 inches by 4 inches were suspended in a 2 wt. % $Na_2CO_3$ aqueous solution (based on the total weight of the $Na_2CO_3$ aqueous solution) in a beaker and mixed with a magnetic bar (at 600 rpm). A 20 wt. % $CaCl_2$ aqueous solution (based on the total weight of the $CaCl_2$ aqueous solution) was then added with a syringe pump at a rate of 30 ml/hr to the stirred $Na_2CO_3$ aqueous solution containing the submersed paper towel pieces. As would be appreciated by one of skill in the art, and with the help of this disclosure, reaction conditions such as concentrations, temperature, stirring rate, and reagent addition rate could be varied to control the size and the amount of calcium carbonate particles formed on the paper substrate. The paper was removed from the beaker, was gently rinsed with deionized (DI) water, and then was dried in an oven (set at 100° F. or at room temperature), and the resulting calcium carbonate particles are displayed in FIG. 1B.

Another method of preparing the abrasive composition as disclosed herein entailed bubbling carbon dioxide through a calcium hydroxide aqueous solution (i.e., limewater) in the presence of a paper substrate (e.g., cellulose fibers). The reaction was conducted at room temperature where calcite is expected to form. Typically, paper substrates (Scott multipurpose paper towels) having a rectangular shape with a size of about 2 inches by 4 inches were suspended in a saturated limewater solution in a beaker. Air containing carbon dioxide was bubbled through the limewater solution from the bottom of the beaker for several hours. As would be appreciated by one of skill in the art, and with the help of this disclosure, reaction conditions such as concentrations, temperature, and reagent bubbling rate could be varied to control the size and the amount of calcium carbonate particles formed on the paper substrate. The paper was removed from the beaker, was gently rinsed with deionized (DI) water, and then was dried in an oven (set at 100° F. or at room temperature). The calcium carbonate particles produced by this method appeared similar to the calcium carbonate particles displayed in FIG. 1B, owing to both methods being performed at room temperature where calcite is expected to form.

The abrasive compositions prepared by each of the two methods were tested to demonstrate their abrasive character, e.g., to show how a portion of the paper coated with calcium carbonate particles would scratch, remove and disturb (i.e., abrade) a material on the surface of another material. Under a constant applied load and area, the coated paper (i.e., abrasive composition) was slid across a graphite mark, and the result was compared with the uncoated paper, as displayed in FIG. 2. Experiments #1 and #3 tested uncoated paper (i.e., no treatment of the paper). Experiments #2 and #4 tested paper coated with calcium carbonate particles prepared with carbon dioxide and limewater (i.e., $CO_2$ method). Experiment #5 tested paper coated with calcium carbonate particles prepared with calcium chloride aqueous solution and sodium carbonate aqueous solution (i.e., $CaCl_2$ method). The testing conditions were the same in all 5 experiments: 1.32 lbs load; 0.25 inches load diameter; 0.049 in$^2$ load area; and 26.9 psi load pressure. The abrasiveness of the abrasive compositions could be tested by a friction test, such as the tribology test by using an Anton Paar rheometer.

Figure 2:
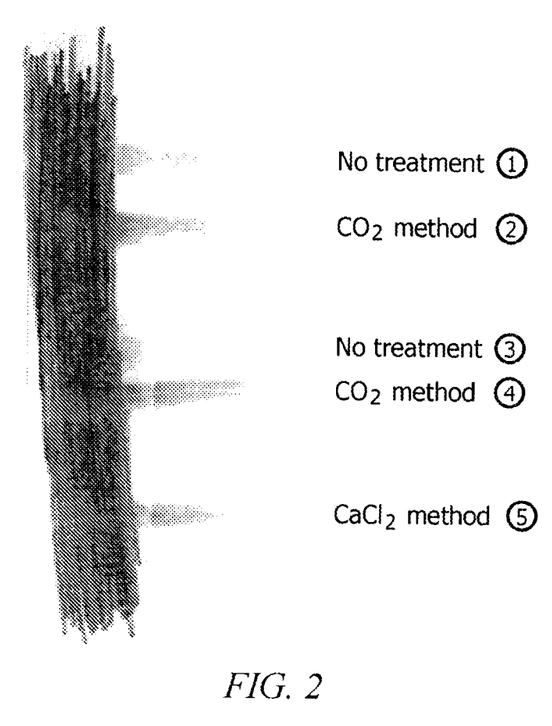
FIG. 2 displays a picture of the abrasive effect of various abrasive compositions on graphite markings on paper.

As it can be seen from FIG. 2, the coated paper (experiments #2, #4, and #5) disturbed and scratched the graphite marking significantly more than the uncoated paper (experiments #1, and #3), thereby showing the abrasive character of the coated paper (i.e., abrasive composition). The coated substrates (e.g., paper, sponges, etc.) could display an increased cleaning efficiency as compared to the uncoated substrates.

In the case of the $CO_2$ method, the weight of the coated paper was increased by a factor of 1.9 owing to the addition of the calcium carbonate particles onto the paper substrate. Calcium carbonate particles were about 46 wt. % of the coated substrate, based on total weight of the coated substrate (for the $CO_2$ method). For the $CO_2$ method, the coating depends on the duration of the $CO_2$ (or $CO_2$-containing air) introduced. A lower amount of the $CaCO_3$ particles coated on a substrate will be achieved with a shorter $CO_2$ bubbling time.

Example 2

The properties of various abrasive compositions were investigated. More specifically, the properties of abrasive compositions prepared by two different methods using a sponge substrate (i.e., cellulosic sponge) were investigated, as follows.

A method of preparing the abrasive composition as disclosed herein entailed combining a calcium chloride aqueous solution with a sodium carbonate aqueous solution in the presence of a sponge substrate (e.g., sponge fibers). The calcium carbonate particles were deposited on a cellulosic sponge, and the resulting calcite crystals on the sponge fibers were imaged via scanning electron microscopy (SEM) as displayed in FIG. 3A. The reaction was conducted at room temperature where calcite is expected to form. Cellulosic sponge substrates having a rectangular prism shape with a size of about 0.5 inches by 0.5 inches by 1 inch were suspended in a 2 wt. % $Na_2CO_3$ aqueous solution (based on the total weight of the $Na_2CO_3$ aqueous solution) in a beaker and mixed with a magnetic bar (at 600 rpm). A 20 wt. % $CaCl_2$ aqueous solution (based on the total weight of the $CaCl_2$ aqueous solution) was then added with a syringe pump at a rate of 30 ml/hr to the stirred $Na_2CO_3$ aqueous solution containing the submersed sponge pieces. As would be appreciated by one of skill in the art, and with the help of this disclosure, reaction conditions such as concentrations, temperature, stirring rate, and reagent addition rate could be varied to control the size and the amount of calcium carbonate particles formed on the sponge substrate. The sponge was removed from the beaker, was gently rinsed with deionized (DI) water, and then was dried in an oven (set at 100° F. or at room temperature).

Figure 3A:
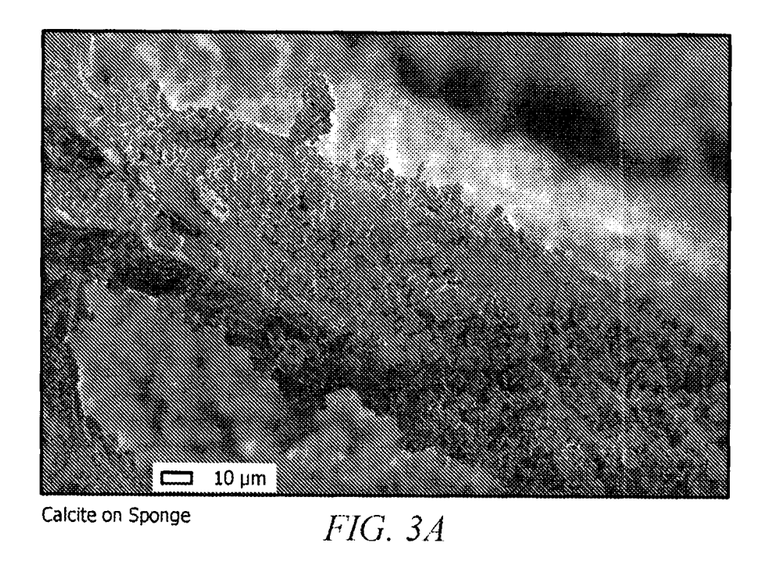
FIGS. 3A and 3B display scanning electron microscope (SEM) images of calcite and aragonite particles, respectively, on a sponge substrate.
Figure 3B:
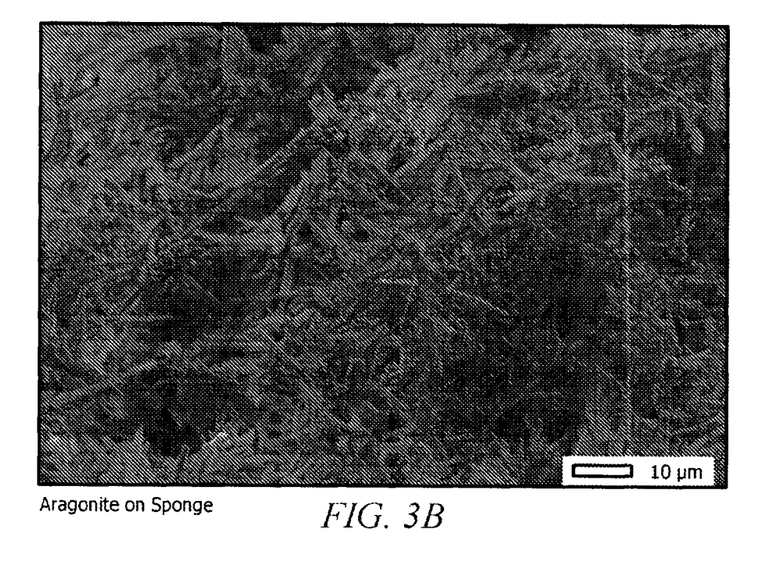

Another method of preparing the abrasive composition as disclosed herein entailed the same method as disclosed for preparing the calcium carbonate particles displayed in FIG. 3A, except for the reaction temperature which was controlled at 70° C., where aragonite crystals are expected to form. The calcium carbonate particles were deposited on a cellulosic sponge, and the resulting aragonite crystals on the sponge fibers were imaged via SEM as displayed in FIG. 3B.

The reaction temperature influenced the morphology of the crystals: calcite (e.g., smaller rounder particles) was obtained at room temperature versus aragonite (e.g., rod-like particles) at 70° C.

Additional Disclosure

A first aspect, which is an abrasive composition comprising a substrate selected from the group consisting of a fibrous substrate, a sponge substrate, and combinations thereof and a plurality of calcium carbonate particles dispersed therein; wherein at least a portion of the plurality of calcium carbonate particles contact the substrate; wherein the fibrous substrate comprises a plurality of fibers; wherein each fiber of the plurality of fibers is characterized by an aspect ratio of equal to or greater than about 2:1; wherein the sponge substrate is characterized by a porosity of equal to or greater than about 5 vol. %, based on the total volume of the sponge substrate; and wherein the abrasive composition is characterized by an abrasiveness that is greater than the abrasiveness of the substrate in the absence of the plurality of calcium carbonate particles.

A second aspect, which is the abrasive composition of the first aspect, wherein at least a portion of the calcium carbonate particles are bonded to the substrate via a physical bond; and wherein the physical bond is selected from the group consisting of electrostatic interaction, van der Waals interaction, ionic interaction, hydrogen bonding, dipole-dipole interaction, and combinations thereof.

A third aspect, which is the abrasive composition of any one of the first and the second aspects, wherein the fibrous substrate comprises a woven substrate, a nonwoven substrate, a sponge, bulk fibers, or combinations thereof.

A fourth aspect, which is the abrasive composition of any one of the first through the third aspects, wherein the plurality of fibers comprise natural fibers, synthetic fibers, or both natural fibers and synthetic fibers.

A fifth aspect, which is the abrasive composition of any one of the first through the fourth aspects, wherein the plurality of fibers comprise cellulosic fibers, spongin fibers, protein fibers, wool fibers, silk fibers, rayon fibers, polymeric fibers, polyethylene fibers, high-density polyethylene fibers, polyethylene terephthalate fibers, polypropylene fibers, aramid fibers, Nylon 6,6 fibers, polyvinyl alcohol fibers, resin fibers, epoxy-based fibers, treated fibers, surface treated fibers, chemically treated fibers, plasma treated fibers, or combinations thereof.

A sixth aspect, which is the abrasive composition of any one of the first through the fifth aspects, wherein the sponge substrate comprises an open-cell structure; and wherein the sponge substrate comprises a natural sponge, a synthetic sponge, a polymeric sponge, a polyurethane sponge, a polyester sponge, or combinations thereof.

A seventh aspect, which is the abrasive composition of any one of the first through the sixth aspects, wherein the plurality of calcium carbonate particles comprise calcite, aragonite, or both calcite and aragonite; and wherein the plurality of calcium carbonate particles is characterized by a hardness on the Mohs hardness scale of from about 3 to about 4.

An eighth aspect, which is the abrasive composition of any one of the first through the seventh aspects, wherein the plurality of calcium carbonate particles is characterized by a particle size of equal to or greater than about 100 nm.

A ninth aspect, which is the abrasive composition of any one of the first through the eighth aspects, wherein the plurality of calcium carbonate particles is present in an amount of equal to or greater than about 5 wt. %, based on the total weight of the abrasive composition.

A tenth aspect, which is an article formed from the abrasive composition of any one of the first through the ninth aspects.

An eleventh aspect, which is the article of the tenth aspect, wherein the article is selected from the group consisting of a household cleaning item, a towel, a paper towel, a sponge; a polishing item, a surface finishing item, a wood finishing item, an item for polishing between finishing coats; a filter; an $H_2S$ scrubber; a lost circulation material; a wellbore cleaning item, a wellbore equipment cleaner, a drill pipe cleaner, a casing cleaner, a wellbore surface cleaner, a subterranean surface cleaner; and combinations thereof.

A twelfth aspect, which is a method of making an abrasive composition comprising (a) contacting a calcium source, a carbonate source, water, and a substrate to form a reactant mixture; wherein the substrate is selected from the group consisting of a fibrous substrate, a sponge substrate, and combinations thereof; wherein the fibrous substrate comprises a plurality of fibers; wherein each fiber of the plurality of fibers is characterized by an aspect ratio of equal to or greater than about 2:1; wherein the sponge substrate is characterized by a porosity of equal to or greater than about 5 vol. %, based on the total volume of the sponge substrate; and (b) allowing at least a portion of the reactant mixture to react and form a plurality of calcium carbonate particles in the presence of the substrate, thereby producing the abrasive composition; wherein the abrasive composition comprises the substrate and a plurality of calcium carbonate particles dispersed therein; wherein at least a portion of the plurality of calcium carbonate particles contact the substrate; and wherein the abrasive composition is characterized by an abrasiveness that is greater than the abrasiveness of the substrate in the absence of the plurality of calcium carbonate particles.

A thirteenth aspect, which is the method of the twelfth aspect, wherein the calcium source comprises a calcium salt, calcium chloride ($CaCl_2$), calcium hydroxide ($Ca(OH)_2$), calcium nitrite ($Ca(NO_2)_2$), calcium bromate ($Ca(BrO_3)_2$), calcium bromide ($CaBr_2$), calcium iodide ($CaI_2$), or combinations thereof.

A fourteenth aspect, which is the method of any one of the twelfth and the thirteenth aspects, wherein the carbonate source comprises a carbonate, sodium carbonate ($Na_2CO_3$), sodium bicarbonate ($NaHCO_3$), potassium carbonate ($K_2CO_3$), ammonium carbonate (($NH_4)_2CO_3$), carbon dioxide ($CO_2$), or combinations thereof.

A fifteenth aspect, which is the method of the fourteenth aspect, wherein the $CO_2$ is a by-product of an industrial process.

A sixteenth aspect, which is the method of any one of the twelfth through the fifteenth aspects further comprising heating the reactant mixture to a temperature of from about 30° C. to about 95° C.

A seventeenth aspect, which is the method of any one of the twelfth through the sixteenth aspects further comprising heating the reactant mixture to a temperature of equal to or greater than about 70° C., wherein at least a portion of the plurality of calcium carbonate particles comprises aragonite.

An eighteenth aspect, which is the method of any one of the twelfth through the seventeenth aspects further comprising agitating the reactant mixture; wherein agitating comprises stirring, shaking, blending, mixing, gas bubbling, pumping, or combinations thereof.

A nineteenth aspect, which is the method of any one of the twelfth through the eighteenth aspects, wherein at least a portion of the calcium carbonate particles form by calcium carbonate crystal nucleation and growth on a surface of the substrate.

A twentieth aspect, which is the method of the nineteenth aspect, wherein at least a portion of the calcium carbonate particles are bonded to the substrate via a physical bond; and wherein the physical bond is selected from the group consisting of electrostatic interaction, van der Waals interaction, ionic interaction, hydrogen bonding, dipole-dipole interaction, and combinations thereof.

A twenty-first aspect, which is the method of any one of the twelfth through the twentieth aspects further comprising sizing the abrasive composition.

A twenty-second aspect, which is a method of servicing a wellbore in a subterranean formation comprising (i) preparing a wellbore servicing fluid (WSF) comprising a base fluid and an abrasive composition; wherein the abrasive composition comprises a substrate selected from the group consisting of a fibrous substrate, a sponge substrate, and combinations thereof and a plurality of calcium carbonate particles dispersed therein; wherein at least a portion of the plurality of calcium carbonate particles contact the substrate; wherein the fibrous substrate comprises a plurality of fibers; wherein each fiber of the plurality of fibers is characterized by an aspect ratio of equal to or greater than about 2:1; wherein the sponge substrate is characterized by a porosity of equal to or greater than about 5 vol. %, based on the total volume of the sponge substrate; and wherein the abrasive composition is characterized by an abrasiveness that is greater than the abrasiveness of the substrate in the absence of the plurality of calcium carbonate particles; (ii) placing the WSF in the wellbore and/or subterranean formation; and (iii) allowing at least a portion of the abrasive composition to abrade a material on a surface in the wellbore and/or subterranean formation.

A twenty-third aspect, which is the method of the twenty-second aspect, wherein the WSF comprises a drilling fluid, a completion fluid, or a clean-up fluid.

A twenty-fourth aspect, which is the method of any one of the twenty-second and the twenty-third aspects, wherein the surface in the wellbore and/or subterranean formation comprises a wellbore surface, a wellbore equipment surface, a pipe surface, a casing surface, a subterranean formation surface, or combinations thereof.

A twenty-fifth aspect, which is the method of any one of the twenty-second through the twenty-fourth aspect further comprising recovering at least a portion of the abrasive composition from the wellbore and/or subterranean formation and recycling at least a portion of the recovered abrasive composition to (i) preparing the WSF comprising a base fluid and an abrasive composition.

A twenty-sixth aspect, which is the method of any one of the twenty-second through the twenty-fifth aspects, at least a portion of the calcium carbonate particles are bonded to the substrate via a physical bond; and wherein the physical bond is selected from the group consisting of electrostatic interaction, van der Waals interaction, ionic interaction, hydrogen bonding, dipole-dipole interaction, and combinations thereof.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k^* (R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

For purposes of the disclosure herein, the term "comprising" includes "consisting" or "consisting essentially of." Further, for purposes of the disclosure herein, the term "including" includes "comprising," "consisting," or "consisting essentially of."

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in a subterranean formation comprising:
   (i) preparing a wellbore servicing fluid (WSF) comprising a base fluid and an abrasive composition; wherein the abrasive composition comprises a sponge substrate having a plurality of calcium carbonate particles dispersed therein; wherein at least a portion of the plurality of calcium carbonate particles contact the sponge substrate; wherein at least a portion of the calcium carbonate particles are bonded to the sponge substrate via a physical bond; wherein the physical bond is selected from the group consisting of electrostatic interaction, van der Waals interaction, ionic interaction, hydrogen bonding, dipole-dipole interaction, and combinations thereof; wherein the sponge substrate is characterized by a porosity of equal to or greater than about 5 vol. %, based on the total volume of the sponge substrate; wherein the sponge substrate comprises an open-cell structure; wherein the sponge substrate comprises a natural sponge, a synthetic sponge, a polymeric sponge, a polyurethane sponge, a polyester sponge, or combinations thereof; and wherein the abrasive composition is characterized by an abrasiveness that is greater than the abrasiveness of the sponge substrate in the absence of the plurality of calcium carbonate particles;
   (ii) placing the WSF in the wellbore and/or subterranean formation; and
   (iii) allowing at least a portion of the abrasive composition to abrade a material on a surface in the wellbore and/or subterranean formation.

2. The method of claim 1, wherein the WSF comprises a drilling fluid, a completion fluid, or a clean-up fluid.

3. The method of claim 1, wherein the surface in the wellbore and/or subterranean formation comprises a wellbore surface, a wellbore equipment surface, a pipe surface, a casing surface, a subterranean formation surface, or combinations thereof.

4. The method of claim 1 further comprising recovering at least a portion of the abrasive composition from the wellbore and/or subterranean formation and recycling at least a portion of the recovered abrasive composition to (i) preparing the WSF comprising a base fluid and an abrasive composition.

5. The method of claim 1, wherein the plurality of calcium carbonate particles comprise calcite, aragonite, or both calcite and aragonite; and wherein the plurality of calcium carbonate particles is characterized by a hardness on the Mohs hardness scale of from about 3 to about 4, wherein the plurality of calcium carbonate particles is characterized by a particle size of equal to or greater than about 100 nm, wherein the plurality of calcium carbonate particles is present in an amount of equal to or greater than about 5 wt. %, based on the total weight of the abrasive composition, and wherein the WSF comprises a drilling fluid, a completion fluid, or a clean-up fluid.

6. The method of claim 1, wherein the plurality of calcium carbonate particles comprise calcite, aragonite, or both calcite and aragonite; and wherein the plurality of calcium carbonate particles is characterized by a hardness on the Mohs hardness scale of from about 3 to about 4, wherein the plurality of calcium carbonate particles is characterized by a particle size of equal to or greater than about 100 nm, wherein the plurality of calcium carbonate particles is present in an amount of equal to or greater than about 5 wt. %, based on the total weight of the abrasive composition, and wherein the surface in the wellbore and/or subterranean formation comprises a wellbore surface, a wellbore equipment surface, a pipe surface, a casing surface, a subterranean formation surface, or combinations thereof.

7. The method of claim 1, wherein the plurality of calcium carbonate particles comprise calcite, aragonite, or both calcite and aragonite; and wherein the plurality of calcium carbonate particles is characterized by a hardness on the Mohs hardness scale of from about 3 to about 4, wherein the plurality of calcium carbonate particles is characterized by a particle size of equal to or greater than about 100 nm, wherein the plurality of calcium carbonate particles is present in an amount of equal to or greater than about 5 wt. %, based on the total weight of the abrasive composition, and further comprising recovering at least a portion of the abrasive composition from the wellbore and/or subterranean formation and recycling at least a portion of the recovered abrasive composition to (i) preparing the WSF comprising a base fluid and an abrasive composition.

8. The method of claim 1, wherein the plurality of calcium carbonate particles comprise calcite, aragonite, or both calcite and aragonite; and wherein the plurality of calcium carbonate particles is characterized by a hardness on the Mohs hardness scale of from about 3 to about 4.

9. The method of claim 1, wherein the plurality of calcium carbonate particles is characterized by a particle size of equal to or greater than about 100 nm.

10. The method of claim 1, wherein the plurality of calcium carbonate particles is present in an amount of equal to or greater than about 5 wt. %, based on the total weight of the abrasive composition.

11. The method of claim 1, wherein the abrasive composition is prepared by a process comprising:
  (a) contacting a calcium source, a carbonate source, water, and a sponge substrate to form a reactant mixture; wherein the sponge substrate is characterized by a porosity of equal to or greater than about 5 vol. %, based on the total volume of the sponge substrate; wherein the sponge substrate comprises an open-cell structure; and wherein the sponge substrate comprises a natural sponge, a synthetic sponge, a polymeric sponge, a polyurethane sponge, a polyester sponge, or combinations thereof; and
  (b) allowing at least a portion of the reactant mixture to react and form a plurality of calcium carbonate particles in the presence of the sponge substrate, thereby producing the abrasive composition; wherein at least a portion of the calcium carbonate particles form by calcium carbonate crystal nucleation and growth on a surface of the sponge substrate; wherein the abrasive composition comprises the sponge substrate having a plurality of calcium carbonate particles dispersed therein; wherein at least a portion of the plurality of calcium carbonate particles contact the sponge substrate; and wherein the abrasive composition is characterized by an abrasiveness that is greater than the abrasiveness of the sponge substrate in the absence of the plurality of calcium carbonate particles.

12. The method of claim 11, wherein the calcium source comprises a calcium salt, calcium chloride ($CaCl_2$), calcium hydroxide ($Ca(OH)_2$), calcium nitrite ($Ca(NO_2)_2$), calcium bromate ($Ca(BrO_3)_2$), calcium bromide ($CaBr_2$), calcium iodide ($CaI_2$), or combinations thereof.

13. The method of claim 11, wherein the carbonate source comprises a carbonate, sodium carbonate ($Na_2CO_3$), sodium bicarbonate ($NaHCO_3$), potassium carbonate ($K_2CO_3$), ammonium carbonate ($(NH_4)_2CO_3$), carbon dioxide ($CO_2$), or combinations thereof.

14. The method of claim 11 further comprising heating the reactant mixture to a temperature of from about 30° C. to about 95° C.

15. The method of claim 11 further comprising heating the reactant mixture to a temperature of equal to or greater than about 70° C., wherein at least a portion of the plurality of calcium carbonate particles comprises aragonite.

16. The method of claim 11 further comprising agitating the reactant mixture; wherein agitating comprises stirring, shaking, blending, mixing, gas bubbling, pumping, or combinations thereof.

17. The method of claim 11, wherein the $CO_2$ is a by-product of an industrial process.

18. The method of claim 11, wherein at least a portion of the calcium carbonate particles are bonded to the sponge substrate via a physical bond; and wherein the physical bond is selected from the group consisting of electrostatic interaction, van der Waals interaction, ionic interaction, hydrogen bonding, dipole-dipole interaction, and combinations thereof.

19. The method of claim 11 further comprising sizing the abrasive composition.

20. The method of claim 1, wherein the abrasive composition is present within the WSF in an amount of from about 10 vol. % to about 40 vol. %, based on the total volume of the WSF.

* * * * *